United States Patent [19]

Rekers

[11] 4,118,340

[45] Oct. 3, 1978

[54] NOVEL POLYMERIZATION CATALYST

[75] Inventor: Louis J. Rekers, Wyoming, Ohio

[73] Assignee: National Distillers and Chemical Corporation, New York, N.Y.

[21] Appl. No.: 693,803

[22] Filed: Jun. 7, 1976

[51] Int. Cl.$^2$ ............................ C08F 4/78; C08F 4/22; C08F 4/24

[52] U.S. Cl. .................................... 252/428; 252/430; 252/431 R; 260/438.5 R; 526/132; 526/131; 526/169

[58] Field of Search ................... 252/428, 430, 431 R; 260/438.5 R

[56] References Cited

U.S. PATENT DOCUMENTS

| | | | |
|---|---|---|---|
| 3,484,428 | 12/1969 | Kallenbach | 252/430 X |
| 3,493,554 | 2/1970 | Rekers | 252/431 R X |
| 3,780,011 | 12/1973 | Pullukat et al. | 252/430 X |
| 3,947,433 | 3/1976 | Witt | 252/430 X |
| 3,984,351 | 10/1976 | Rekers et al. | 252/431 R X |
| 3,985,676 | 10/1976 | Rekers et al. | 252/430 X |

*Primary Examiner*—Patrick Garvin
*Attorney, Agent, or Firm*—Kenneth D. Tremain

[57] ABSTRACT

Supported catalyst compositions incorporating preformed materials comprising the reaction product of (1) organoborate compounds such as trialkyl borate, and (2) chromium trioxide. Typical supports constitute an inorganic material of moderate to high surface area, especially a high pore volume (greater than about 1.96 cc/g) silica xerogel. The supported catalysts are utilized alone or in conjunction with other catalytic ingredients such as organometallic and/or organo non-metallic reducing agents for the polymerization of 1-olefins.

21 Claims, No Drawings

NOVEL POLYMERIZATION CATALYST

BACKGROUND OF THE INVENTION

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particle-form process, the resins produced, while useful in many applications, are unsatisfactory for others because of a deficiency in certain properties such as melt index.

Attempts to improve deficient properties of polyolefins produced using supported, heat-activated chromium oxide catalysts have been made by adding various metal and non-metal compounds to the supported chromium oxide prior to activation by heating. For example, in U.S. Pat. No. 3,622,522 it is suggested that an alkoxide of gallium or tin be added to supported chromium oxide prior to heat activation, and the performance of aluminum isopropoxide compared. U.S. Pat. No. 3,715,321 suggests adding a compound of a Group II-A or Group III-B metal to supported chromium oxide prior to heat treatment.

U.S. Pat. No. 3,484,428 discloses an olefin polymerization catalyst composite prepared by impregnating a support such as silica, alumina, zirconia, and thoria with a chromium compound, convertible to chromium oxide upon calcination, and a borane or an alkyl-substituted borane, and then heating and activating both the boron and chromium compounds of the resulting composite on the support in an oxygen-containing atmosphere at a temperature of about 750° to 1800° F. U.S. Pat. No. 3,780,011 discloses an olefin polymerization catalyst prepared by forming an intimate mixture of a silica, alumina, zirconia or thoria support and chromium oxide. The mixture is dried by fluidizing with dry air. An oxygenated titanium, boron or vanadium compound, e.g., alkyl esters of such metals is then added to the fluidized bed, and the resulting fluidized mixture is activated with an oxygen-containing, dry gas at elevated temperatures.

U.S. Pat. No. 3,202,645 defines catalysts, including the combination of a halide of titanium, zirconium, chromium, etc. with the reaction product of e.g., tri-n-butyl borane with a particulate inorganic solid such as silica. U.S. Pat. No. 3,625,864 relates to a supported catalyst including a titaniaboron complex. U.S. Pat. No. 2,898,326 describes a catalyst comprising an activated Group VI-A oxide support impregnated with boranes.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287 and in U.S. Pat. No. 3,474,080.

Use of the above chromium compound catalysts in Ziegler-type coordination catalyst systems has also been proposed. As is well-known in the art, such catalysts frequently additionally comprise organometallic reducing agents such as, for example, trialkyl aluminum compounds. Ziegler-type catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500; and in the copending application Ser. No. 532,131, filed Dec. 16, 1974.

The preparation and use of improved high pore volume silica xerogel materials suitable as catalyst supports is described in Belgium Pat. No. 741,437 and U.S. Pat. Nos. 3,652,214; 3,652,215 and 3,652,216; whereas moderate pore volume silica xerogel supports are disclosed in U.S. Pat. No. 3,453,070.

SUMMARY OF THE INVENTION

This invention relates to the polymerization of 1-olefins, especially ethylene, to form either polyethylene or interpolymers of ethylene and other 1-olefins. The present invention is based on the discovery that the reaction products produced by the reaction of (1) organoborate compounds such as trialkyl borates, and (2) chromium trioxide may be formed into catalytic systems for the products of polymers of 1-olefins of controlled characteristics, by adsorption on an insoluble, inorganic support of moderate to high surface area, generally subjected to treatment at elevated temperatures in a dry, oxygen containing atmosphere, such as dry air.

Additionally, it has been discovered that the aforementioned catalyst system, usually in conjunction with certain organometallic and/or organo non-metallic reducing agents, e.g., triethyl aluminum, triisobutyl aluminum, triethyl boron, etc., permits the production of polymers of 1-olefins having a much broader variety of properties, especially with respect to molecular weight and molecular weight distribution and thus complements and extends the utility of the original or basic catalyst system. Particularly advantageous catalyst systems are obtained when using as a support a silica xerogel of high pore volume, e.g., greater than about 1.96 cc/g, and is available under the trademark Polypor. These silica xerogels are described in U.S. Pat. No. 3,652,214 which silica xerogels have a surface area in the range of 200 to 500 m$^2$/g, a pore volume greater than about 2.0 cc/g, a major portion of the pore volume being provided by pores having diameters in the range of 300 to 600 Å.

The catalyst systems of this invention, when coupled with known polymerization processes, e.g., suspension, solution, vapor phase, etc. can produce polymers of a variety of molecular weights and molecular weight distributions which permit it to cover broadly the major applications of high and medium density polyethylene especially extrusion applications, e.g., blow molding, sheeting, film, etc.

In a general embodiment of this invention the organoborate compound, such as triethyl borate, and the chromium trioxide are brought together in a suitable inert solvent, e.g., dichloromethane, cyclohexane, n-hexane, methylene chloride, carbon tetrachloride, etc. In general, the solid $CrO_3$ is slurried in the solvent and the organoborate compound added. Over a period of time, e.g., about 1 to 2 hours, a reaction between the compounds ensues and the chromium trioxide disappears. During this period the solution becomes reddish-brown in color. It is usually filtered to insure the absence of any unreacted solid $CrO_3$. This solution is then applied to the support in such manner as to effect the deposition of the catalyst solution thereon, suitably by any wet coating technique, e.g., spraying, on a support, e.g., silica, alumina, etc. Typically, the solution is added to a dispersion of the silica gel support. The solvent is removed from the base by drying, e.g., using heat, inert gas stripping, or reduced pressure alone or in combination. In this manner, the reaction product is placed on the support. It is considered significant that the organoborate-chromium oxide is preformed prior to the introduction to the catalyst support. The active catalyst is therefore understood not to derive from chromium trioxide but the organoborate chromium reaction product as described.

The supported catalyst is then heated in a dry, oxygen-containing atmosphere, such as dry air, resulting in a marked promotion of polymerization activity. Heating is conducted at temperatures in the range of from about 400° to 2000° F., and preferably from about 1000° to 1790° F. The time period of the heating will vary depending on the temperature, but usually is conducted for from about at least 2 to 18 and preferably from about 4 to 12 hours.

The supported reaction product, after heat treatment, is then used alone or in conjunction with organometallic and/or organo non-metallic reducing agents, e.g., a trialkyl aluminum, dialkyl zinc, dialkyl magnesium, dialkyl aluminum chloride, dialkyl aluminum alkoxides, triethyl boron, etc., to polymerize 1-olefins. When used with such reducing agents, the catalyst systems provide a method for securing a desirable latitude of polymer properties together with increased catalyst productivity.

In the following detailed description of the invention and operative Examples, a measure of the viscoelastic bahavior of the polymer melt is expressed in values for melt index (M.I., determined in accordance with ASTM-D-1238, at 2 kg load and 190° C) and high load melt index (HLMI, 10X) load and the shear sensitivity, (response of melt viscosity to the differential shear rates) is reflected in the HLMI/MI ratios. In general, the broader the molecular weight distribution, the more sensitive is the viscosity to shear rate i.e. the higher the HLMI/MI ratio.

DETAILED DESCRIPTION OF THE INVENTION

Among the organic boron compounds which may be used in the catalyst systems of this invention are the triorganoborates including such compounds as triethyl borate, tributyl borate, etc. These materials may of course comprise mixtures. The organoborate chromium reaction product structure is not now known with certainty but it is believed to be represented formulaically in the following:

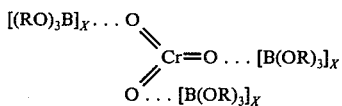

wherein X is about 3 and wherein R is an aliphatic or aromatic organic radical having from 1 to 6 carbon atoms. The alkyl derivatives and particularly the trialkyl borates, having up to 12 carbon atoms, are preferred.

Typical examples of the preparation of the catalyst systems follow.

CATALYST PREPARATIONS (A) 150 ml of methylene chloride were placed in a 3-neck 500 ml flask equipped with a nitrogen inlet for blanketing, a gas outlet tube, magnetic stirring means, and a 100 ml dropping funnel. Under a nitrogen cover, 2.21 gms $CrO_3$ were added to the stirred flask containing the methylene chloride solvent. From the dropping funnel 3.45 gms triethyl borate (0.023 m) were added over a period of 1.5 hours under ambient temperature conditions and with stirring. Upon the addition of the triethyl borate the contents in the flask turned dark brown in color, and part of the $CrO_3$ disappeared via reaction. The resulting reaction product mixture was filtered and a considerable amount of solids were removed. The filtrate weighed 157 gms.

In order to place the filtrate on a support, 27 grams of Polypor silica gel having a high pore volume (about 2.5 cc/gm) were placed in a 2000 ml round bottom flask, equipped with a stirrer and provided with a nitrogen blanket. Then 118 grams of the dark brown filtrate were added to the flask containing the silica gel. After stirring for about 30 minutes, the stirrer was turned off and the gel was allowed to settle. The resulting slurry of silica gel and filtrate was dried in a rotary evaporator at 55° C. and 29 inches Hg vacuum. The dried, coated silica gel was then treated at 1650° F. for 6 hours while simultaneously passing dry air through the catalyst. Analysis of the treated silica gel indicated a chromium content of 0.31% by weight. This corresponds to a B/Cr atomic ratio of about 10/1 on the basis of the amount of triethyl borate used.

(B) 300 ml of methylene chloride were placed in a 3-neck 500 ml flask equipped with a nitrogen inlet for blanketing, a gas outlet tube, magnetic stirring means, and a 100 ml dropping funnel. Under a nitrogen cover 2.2 gms $CrO_3$ were added to the stirred flask containing the methylene chloride solvent. From the dropping funnel 3.2 gms triethyl borate were slowly added. Stirring was continued for 1 hour, and the solution became a dark brown color. The resulting reaction product mixture was filtered through fluted filter paper and 286 gm of filtrate was recovered.

In order to place the desired reaction product on a support, 108 grams of microspherical silica gel having a pore volume of 1.6 cc/gm (Davison MS952) were placed in a 2000 ml round bottom flask, equipped with a stirrer and provided with a nitrogen blanket. Then the brown filtrate (the solution was passed through the filter to insure the absence of unreacted $CrO_3$) was added to the flask containing microspherical silica gel. Within a few minutes, the gel had turned a brownish color. This indicated that the catalyst reaction product was very strongly and preferentially adsorbed on the gel. The treated silica gel was dried in a rotary evaporator at 55° C. and 29 inches Hg vacuum. The dried, catalyst-coated silica gel was then treated at 1560° F. for 6 hours while simultaneously passing dry air through the catalyst. Analysis of the silica gel indicated a chromium content of 0.13% by weight which corresponds to a B/Cr atomic ratio of about 8/1.

(C) In a manner of preparation similar to that of Catalyst A but utilizing 3.01 gms $CrO_3$, 43.8 gms triethyl borate, and 250 ml of dichloro-methane as reaction media and solvent, a solution of the triethyl borate-chromium trioxide reaction product was prepared. The triethyl borate was slowly added to the flask while stirring was continued. After 2 hours of stirring the contents were filtered through fluted filter paper but nothing was filtered off indicating the $CrO_3$ had completely reacted with the triethyl borate. The filtrate weighed 324 gms and 319 gms of this were applied to 200 gms of a high pore volume (approximately 2.5 cc/gm) Polypor Silica Gel. The dichloromethane was removed on a rotary evaporator as previously described in Catalyst A preparation. The dried and coated silica gel was then air heat treated at 1650° F. for 6 hours. From this treatment were recovered 145 gms of peach colored catalyst. From the calculations based on the amounts of $CrO_3$ and triethyl borate used in the reaction, the atomic ratio of B/Cr on the gel was 10/1 and the chromium content was 0.77% by weight.

(D) In still another catalyst preparation and following the procedure of Catalyst A, 270 gms of dichloromethane and 30.45 gms of triethyl borate were placed in a 3-neck 500 ml round bottom flask equipped with stirrer and nitrogen blanket. While stirring 5.5 gms of chromium trioxide were introduced. After stirring for 1 hour the mixture was filtered and the filtrate containing the soluble reaction product was applied to a high pore volume (approximately 2.5 cc/gm) Polypor Silica Gel and the volatile portion removed on a rotary evaporator as done in the previous catalyst preparations. This coated and dried gel was then air heat treated at 1650° F. for 6 hours. This catalyst was then analyzed for both boron and chromium and the following found: 0.61% wt. boron and 0.28% wt. chromium which corresponds to an atomic ratio of B/Cr of about 10/1.

The foregoing catalysts are utilized in the polymerization of olefins with or without various reducing agents such as triisobutyl aluminum and triethyl boron.

The amounts of organoborate-chromium trioxide reaction product mixture deposited on the support may vary widely depending on the nature of the compound and the desired levels of chromium and boron. Likewise the amount of reducing agents used in conjunction with the organoboryl chromate catalyst may vary.

The most effective catalysts have been found to be those containing the organoborate-chromium trioxide reaction product in an amount such that the amount of Cr by weight on the support is from about 0.10 to 2.5% and preferably is from about 0.10 to 1.25%, although amounts outside the foregoing ranges still yield operable catalysts. The catalyst is commonly prepared at equimolar ratio, although an excess of the organoborate compound may be employed. Boron to chromium atomic ratios, calcuated on an elemental weight basis, in the supported catalyst are typically within the range of 8/1 to 12/1.

In proportioning the amount of reducing agent to the amount of organoborate-chromium trioxide reaction product used as the catalyst, fairly wide latitude is available, but some guidelines have been established consistent with good yield, favorable polymer properties, and economic use of materials. For example, in the use of organometallic and organo non-metallic reducing agents with an amount of organoborate-chromium trioxide reaction mixture sufficient to yield about 1% Cr by weight of the support the parameters set forth below are representative. The atomic ratios are based upon a calculation of the metal in the organometallic reducing agent and the non-metal in the organo non-metallic reducing agent versus the chromium content present in the organoborate-chromium-trioxide reaction product.

For example, based upon an amount of organoborate chromium trioxide reaction product containing about 1% by weight of Cr based upon the weight of the support, the preferred amount of an organometallic reducing agent for use therewith, e.g., triisobutyl aluminum (TIBAL), is an amount to give an Al/Cr atomic ratio of about 2.5/1. The preferred range of atomic ratios of Al to Cr is from about 1/1 to about 5/1. The overall practicable limits of TIBAL in terms of the Al/Cr atomic ratio are from about 0.1/1 to 20/1.

Another example of an organometallic reducing agent for use in conjunction with the organoborate-chromium trioxide reaction product is triethyl aluminum. Again based upon an amount of organoborate chromium trioxide reaction product containing about 1% by weight of Cr based upon the weight of the support, the preferred amount of triethyl aluminum (TEA) is an amount to give an Al/Cr atomic ratio of about 3/1. The preferred range of atomic ratios of Al to Cr is from about 1/1 to about 5/1. The overall practicable limits of TEA in terms of an Al/Cr ratio, are from about 0.1/1 to 20/1.

Triethyl boron (TEB) may be taken as the preferred example of the proportions of non-metallic reducing agent for use in conjunction with the organoborate chromium trioxide reaction product. Again based upon an amount of organoborate chromium trioxide reaction product containing about 1% by weight of Cr based upon the weight of the support, the preferred amount of TEB would give a B/Cr atomic ratio of about 5/1. The preferred range of atomic ratios of B to Cr is from about 0.1/1 to 15/1. The overall practicable limits, in terms of a B/Cr ratio, are from about 0.1/1 to about 20/1.

With respect to the supported catalyst comprising the organoboryl chromium compound deposited on the support the conditions of treatment at elevated temperatures may be varied. In general, the catalyst is heated in dry air or other dry oxygen containing gas at a temperature above about 400° F. and preferably over about 650° F. for a period of about 2 hours or more. Using the preferred high pore volume silica gel support described above, heating in the range of from about 1450° F. to about 1650° F. for up to about 6 hours is desirable. For other supports, a heat treatment at above about 400° F. and preferably about 1000° F. for about 6 hours is effective.

The dry air or other oxygen containing gas should preferably be dehumidified down to a few parts per million (ppm) of water to obtain maximum productivity from the catalyst. Typically the air used in the processes described in this application is dried to less than about 2-3 ppm of water.

As indicated above, the catalysts of this invention are useful in conventional polymerization processes and are suitable for polymerization effected under temperature and pressure conditions generally employed in the art, e.g., temperature of from about 100° F. to about 400° F. and preferably from about 160° F. to 230° F., and pressures of from 200 to 1000 psig and preferably from 300 to 800 psig, as are used in slurry polymerizations.

The following Examples illustrate the use of the catalyst systems of the invention in methods for polymerization of alpha olefins such as ethylene.

POLYMERIZATION EXAMPLES

I. To a stirred one gallon autoclave there was added 0.89 kg of isobutane, ethylene pressure of 140 psig to give 10 mole % in the liquid phase, 30 psig $H_2$ pressure and from 0.72 to 1.04 gms of Catalyst A as described above, and sufficient triisobutyl aluminum or triethylboron to give the atomic ratios shown in the table. The stirred autoclave with the above contents was heated to 210° F. At this time the total pressure was 450 psig. Polymerization began almost immediately as noted by the ethylene coming from the ethylene demand supply system to the reactor. After one hour of polymerization the reaction was terminated by dropping the reactor contents into the pressure let-down system. Three separate runs were carried out and the results are reported in Table I.

TABLE I

| | Polymerization of Ethylene with Catalyst A | | | | |
|---|---|---|---|---|---|
| Runs | Co-Catalyst | Al/Cr | Productivity gms Polymer/gm Cat/hr | MI | HLMI |
| (a) | TIBAL (1) | 2.5 | 422 | 4.3 | 182 |
| (b) | TIBAL | 2.5 | 878 | 3.3 | 132 |
| (c) | TEB (2) | 4.5(3) | 315 | 0.98 | 118 |

(1) Triisobutyl aluminum
(2) Triethyl boron
(3) B/Cr ratio (from TEB only)

II. To a stirred 1 gallon autoclave there was added 0.89 kg of isobutane, ethylene pressure of 140 psig to give 10 mole % in the liquid phase, 30 psig $H_2$ pressure, and from 0.8 to 1.07 gms Catalyst B as described above, and sufficient triisobutyl aluminum to give the mole ratios shown in Table II. The stirred autoclave with the above contents was heated to 200° F. At this time the total pressure was 415 psig. Polymerization began almost immediately as noted by the ethylene coming from the ethylene demand supply system to the reactor. After one hour of polymerization the reaction was terminated by dropping the reactor contents into the pressure let-down system. Four runs were carried out and the results are reported in Table II.

TABLE II

| Catalyst | Co-Catalyst | Al/Cr (1) | Productivity gms Polymer/gm Cat/hr | MI | HLMI |
|---|---|---|---|---|---|
| B | None | — | 231 | Low | 4.90 |
| B | None | — | 383 | Low | 6.0 |
| B | TIBAL (1) | 1.35 | 220 | Low | 8.2 |
| B | TIBAL (1) | 2.70 | 294 | 2.7 | 281 |

(1) Triisobutyl aluminum

The lowest value for melt index that may be measured with reasonable accuracy is about 0.1. The "low" values reported above may represent actual values as little as 0.05 or less.

III. Catalyst C (0.98 gms), prepared as described above was added to a stirred autoclave with 0.89 kg. of isobutane, ethylene pressure of 140 psig added to give 10 mole %, and 0.33 gm hydrogen/kg solvent. The stirred autoclave was then heated to 200° F. and the total pressure reached 415 psig. Following an induction period of about 10 minutes polymerization began as noted by the ethylene coming from the ethylene demand supply system to the reactor. After 1.0 hours of polymerization the reaction was terminated by dropping the reactor contents into the pressure let-down system. About 353 gms of polyethylene/g catalyst was produced. The resulting polyethylene powder had a melt index (MI) of 0.1, a high load melt index (HLMI) of 10.7 and a HLMI/MI ratio of 107.

IV. Catalyst D, prepared as described above, was similarly employed successfully to prepare polyethylene in a brief trial run.

In accordance with another feature of the present invention still further improved olefin polymerization catalysts are prepared by codepositing on the inorganic support material the organoborate-chromium trioxide reaction product in conjunction with an aluminum compound capable of reacting with the surface hydroxyl groups of the support material. The supported organoborate-chromium trioxide reaction product and aluminum compound are then heated in a non-reducing atmosphere at a temperature above about 300° C. up to the decomposition temperature of the support material. The resulting heat treated, supported catalyst may then be combined with the metallic and non-metallic reducing agents, preferably a boron compound, as described above.

Aluminum compounds useful in the codeposition step are characterized as any aluminum compound capable of reacting with the surface hydroxyl groups of the inorganic support material. Preferred aluminum compounds may be represented by the formula:

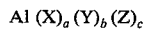

wherein X is R, Y is OR, and Z is H or a halogen; $a$ is 0–3, $b$ is 0–3, $c$ is 0–3, and $a + b + c$ equals 3; and R is an alkyl or aryl group having from one to eight carbon atoms.

Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

This modified catalyst may be prepared by depositing the organoborate-chromium trioxide reaction product and the aluminum compound on the inorganic support in any suitable manner such as by vapor coating or by impregnating the support with solutions of the aforedescribed reaction product and the aluminum compound in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The organoborate-chromium trioxide reaction product may be applied to the support first or the aluminum compound may be applied first or both may be applied together. In the usual method of catalyst preparation, the support is impregnated first with the organoborate-chromium trioxide reaction product and then with the aluminum compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

More specifically, after the organoborate-chromium trioxide reaction product has been deposited on the inorganic support, the support is heated in a non-reducing atmosphere, preferably in an oxygen-containing atmosphere, at a temperature above about 400° F. up to the decomposition temperature of the support. Typically, the supported compositions are heated at a temperature of from 400° to 2000° F. for a time period of 2 to 18 hours. The non-reducing atmosphere which is preferably air or other oxygen-containing gas should be dry and preferably should be dehumidified down to a few parts per million (ppm) of water to obtain maximum catalyst activity. Typically, air used in the procedure described in this application is dried to less than 2-3 ppm of water. The resulting heat-treated, supported catalyst is then combined with metallic and/or non-metallic reducing agents to provide the further improved catalyst systems for the polymerization of olefins. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal reducing agents include boron alkyls such as triethyl borane, triisobutyl borane and trimethyl borane and hydrides of boron such as diborane, pentaborane, hexaborane and decaborane. The heat-treated, supported catalyst may be combined with the metallic or nonmetallic reducing agent prior to being fed to an olefin polymerization reactor or these two components may be fed separately to an olefin polymerization reactor.

In proportioning the amount of metallic or nonmetallic reducing agent to the amount of chromium present in the catalyst system, fairly wide latitude is available, but some guidelines have been established consistent with good yield, favorable polymer properties and economic use of materials. For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to a total Al/Cr atomic ratio of about 2.5/1. The preferred range of atomic ratios of total Al to Cr is from about 0.1/1 to 10/1, or from about 0.23% to about 23% by weight TIBAL.

Another example of an organometallic reducing agent for use in conjunction with the catalyst composition of the present invention is triethyl aluminum (TEA). Again based upon a catalyst composition containing about 1% by weight of Cr based upon the weight of the support, the preferred amount of triethyl aluminum is about 6.0% by weight based upon the weight of the support giving a total Al/Cr atomic ratio of about 2.5/1. The preferred range of atomic ratios of total Al to Cr is from about 0.1/1 to about 10/1, or from about 0.24 to 24% by weight of TEA added as the reducing agent.

Triethyl boron (TEB) may be taken as the preferred non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a total B/Cr atomic ratio of about 2.5/1. The preferred range of atomic ratios of total B to Cr is from about 0.1/1 to 10/1, or from about 0.2 to about 20% TEB added as the reducing agent.

While particular embodiments of this invention are shown above, it will be understood that the invention is obviously subject to variations and modifications without departing from its broader aspects.

What is claimed is:

1. An olefin polymerization catalyst composition comprising a solid inorganic support material having deposited thereon a preformed organoborate-chromium product obtainable by the reaction of chromium trioxide and a trihydrocarbyl borate, said composition having been heated in a dry non-reducing atmosphere at a temperature above about 400° F. and below the temperature at which the structure of the support is impaired, and for a period of time sufficient to promote the polymerization activity of said catalyst composition for the polymerization of 1-olefins.

2. The catalyst composition of claim 1 wherein said inorganic support is a silica gel.

3. The catalyst composition of claim 1 wherein said borate is a trialkyl borate.

4. The catalyst composition of claim 1 wherein said organoborate chromium product is present on the support material in an amount sufficient to provide from about 0.25 to about 2.5% by weight of Cr based upon the weight of the support material.

5. The catalyst composition of claim 2 wherein the silica gel support is a silica xerogel having a surface area within the range of 200 to 500m$^2$/g, a pore volume greater than 1.96 cc/g and wherein the major portion of said pore volume is provided by pores having pore diameters within the range of from about 300 to 600 Å.

6. The catalyst composition of claim 1 combined with an organic reducing agent.

7. The catalyst composition of claim 6 wherein the reducing agent is an organoaluminum compound, and the ratio of the aluminum of said reducing agent to the chromium of said organoborate chromium reaction product is between about 0.1/1 and 20/1.

8. The catalyst composition of claim 7 wherein said reducing agent is an aluminum alkyl.

9. The catalyst of claim 6 wherein the reducing agent is an organoboron compound, and the ratio of the boron of said reducing agent to the chromium of said organoborate chromium reaction product is between about 0.01/1 and 20/1.

10. The catalyst of claim 9 wherein said reducing agent is triethyl boron.

11. A process for the preparation of a catalyst composition comprising reaction chromium trioxide with a trihydrocarbyl borate and depositing the resultant organoborate chromium product upon a solid inorganic support material, heating said support material and said organoboryl product in a dry oxygen containing atmosphere at a temperature above about 400° F. and below the temperature at which the structure of the support is impaired for a period of time sufficient to promote the activity of the composition for the polymerization of 1-olefins.

12. The process of claim 11 wherein said support material is a silica gel.

13. The process of claim 11 wherein the chromium trioxide and trihydrocarbyl borate are reacted at a molar ratio of trihydrocarbyl borate to chromium trioxide of at least 1:1.

14. The process of claim 11 wherein the organoborate chromium product is deposited as a solution in an inert solvent, and the deposition is proportioned such that there is provided from about 0.25 to about 2.5% by weight of Cr based upon the weight of the support material.

15. The process of claim 12 wherein said support material is a silica gel having a surface area within the range of 200 to 500 m$^2$/g, a pore volume greater than 1.96 cc/g and wherein the major portion of said pore volume is provided by pores having pore diameters within the range of from about 300 to about 600 Å.

16. The process of claim 15 wherein the heat treating is conducted at a temperature of from about 1000 to about 2000° F. for a period of from about 2 to 12 hours.

17. The process of claim 16 wherein said borate is a trialkyl borate.

18. A process for the preparation of a catalyst composition for the polymerization of 1-olefins comprising reacting a trihydrocarbyl borate with chromium oxide in an inert organic solvent, depositing the organic solvent soluble organoborate-chromium reaction product upon a silica xerogel having a surface area within the range of 200 to 500 m$^2$/g a pore volume greater than 1.96 cc/g and wherein the major portion of said pore volume is provided by pores having pore diameters within the range of from about 300 to 600 Å and heating in a dry oxygen containing atmosphere at a temperature above about 400° F. and below the temperature at which the structure of the support is impaired for a period of time sufficient to promote the activity of the composition for the polymerization of 1-olefins.

19. The process of claim 18 wherein said reaction product is $[(RO)_3B]_x \cdot CrO_3$ wherein x is about 3 and wherein R is an aliphatic or aromatic hydrocarbyl radical having from 1 to 6 carbon atoms.

20. The process of claim 19 wherein R is ethyl.

21. A reaction product of triethyl borate and chromium trioxide having the formula $[(CH_3CH_2O)_3B]_x \cdot CrO_3$ wherein X is about 3.

* * * * *